US009025432B2

(12) United States Patent
Parameswaran et al.

(10) Patent No.: US 9,025,432 B2
(45) Date of Patent: May 5, 2015

(54) OPTIMIZATION FOR TRILL LAN HELLOS

(75) Inventors: Ramkumar Parameswaran, Cupertino, CA (US); Varun Shah, Milpitas, CA (US); Erik Nordmark, Mountain View, CA (US); Ayan Banerjee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 13/465,218

(22) Filed: May 7, 2012

(65) Prior Publication Data

US 2013/0294221 A1 Nov. 7, 2013

(51) Int. Cl.
*H04J 1/16* (2006.01)
*H04L 12/751* (2013.01)
*H04L 12/721* (2013.01)

(52) U.S. Cl.
CPC ............. *H04L 45/02* (2013.01); *H04L 45/026* (2013.01); *H04L 45/66* (2013.01)

(58) Field of Classification Search
CPC ...................................................... H04L 12/56
USPC ......... 370/216, 219, 221, 225, 252, 256, 390, 370/392, 400, 401; 709/218, 220
See application file for complete search history.

(56) References Cited

U.S. PATENT DOCUMENTS

| 8,369,335 | B2 * | 2/2013 | Jha et al. ........................ 370/392 |
| 2009/0161584 | A1 * | 6/2009 | Guan ............................. 370/256 |
| 2009/0296565 | A1 * | 12/2009 | Kuo et al. ...................... 370/219 |
| 2010/0165995 | A1 * | 7/2010 | Mehta et al. ................... 370/400 |
| 2010/0246388 | A1 * | 9/2010 | Gupta et al. ................... 370/225 |
| 2011/0019678 | A1 * | 1/2011 | Mehta et al. ................... 370/401 |
| 2011/0228780 | A1 * | 9/2011 | Ashwood-Smith et al. .. 370/392 |
| 2011/0273980 | A1 * | 11/2011 | Ashwood Smith ........... 370/225 |
| 2011/0299409 | A1 * | 12/2011 | Vobbilisetty et al. ......... 370/252 |
| 2012/0044944 | A1 * | 2/2012 | Kotha et al. ................... 370/401 |
| 2012/0163164 | A1 * | 6/2012 | Terry et al. .................... 370/221 |
| 2012/0320739 | A1 * | 12/2012 | Kamath et al. ................ 370/225 |
| 2012/0320926 | A1 * | 12/2012 | Kamath et al. ................ 370/401 |

(Continued)

FOREIGN PATENT DOCUMENTS

| CN | 102223303 A | 10/2011 |
| CN | 102404216 A | 4/2012 |

(Continued)

OTHER PUBLICATIONS

D. Eastlake et al., "TRILL: Clarifications, Corrections, and Updates; draft-ietf-trill-clear-correct-00.txt," Internet Engineering Task Force, IETF, Standardwork1ngdraft, Internet Society (ISOC) 4, Rue des Falaises CH-1205 Geneva, Switzerland, Jan. 27, 2012, pp. 1-28.*
D. Eastlake et al. IETF (Internet Engineering Task Force) TRILL (Transparent Interconnection of Lots of Links) Protocol Updates to RFC 6325, RFC 6327, and RFC 6439, Jan. 27, 2012.*
Partial International Search Report mailed Jul. 7, 2013 in Application No. PCT/US2013/039718, 7 pages.

(Continued)

*Primary Examiner* — Chirag Shah
*Assistant Examiner* — Jael Ulysse
(74) *Attorney, Agent, or Firm* — Merchant & Gould

(57) ABSTRACT

Systems and methods may be provided embodying an optimized Trill LAN network hello mode. The optimized hello mode may allow the number of LAN hellos exchanged to be reduced significantly in a steady state mode of operation. No modifications to the current Trill specification are needed and in a converged state (when designated RBridge election and appointed forwarder appointments are complete), only 1 hello PDU per RBridge is originated in every hello interval.

18 Claims, 5 Drawing Sheets

(56) References Cited

U.S. PATENT DOCUMENTS

| | | | |
|---|---|---|---|
| 2013/0003733 A1* | 1/2013 | Venkatesan et al. | 370/390 |
| 2013/0254356 A1* | 9/2013 | Eastlake, III | 709/220 |
| 2013/0279513 A1* | 10/2013 | Eastlake, III | 370/410 |
| 2013/0315253 A1* | 11/2013 | Hegland et al. | 370/400 |
| 2013/0332573 A1* | 12/2013 | Hegland et al. | 709/218 |

FOREIGN PATENT DOCUMENTS

| | | |
|---|---|---|
| WO | WO 2009/113786 A2 | 9/2009 |
| WO | WO 2012/171462 A2 | 12/2012 |

OTHER PUBLICATIONS

Eastlake et al., "TRILL: Clarifications, Corrections, and Updates; draft-ietf-trill-clear-correct-00.txt," Internet Engineering Task Force, IETF, Standardworkingdraft, Internet Society (ISOC) 4, Rue des Falaises CH-1205 Geneva, Switzerland, Jan. 27, 2012, pp. 1-28.

Perlman et al., "Routing Bridges (RBridges): Base Protocol Specification; rfc6325.txt," Internet Engineering Task Force, IETF; Standard, Internet Society (ISOC) 4, Rue des Falaises CH-1205 Geneva, Switzerland, Jul. 22, 2011.

\* cited by examiner

300

---

At the designated RBridge, optimized-hello mode exited when the designated RBridge sees a hello from a new neighbor and is on a vlan that is present in the enabled-vlans-set on the designated Rbridge
310

▼

If an inbound hello is seen on a vlan in an appointed forwarder node's enabled vlan set and if the designated RBridge priority of the new neighbor is higher than that of the current designated RBridge priority, the node must exit optimized hello mode immediately
320

▼

Other nodes on the network (such as non-designated RBridges and non-appointed forwarders) operating in the optimized hello mode are monitored for triggers. If a hello is received from a new neighbor on a locally enabled vlan and if the designated RBridge priority of that node is higher than the priority of the currently designated RBridge, then the other node must exit optimized hello mode immediately.
330

It is detected that a non-designated RBridge or a non-appointed forwarder has gone down. No action is required in this instance.
410

The designated RBridge realizes the failure of an appointed forwarder when the hello on the desired designated vlan from the appointed forwarder starts timing out. The designated RBridge then re-runs the appointed forwarder appointment algorithm. The optimized hello mode must be exited immediately.
420

Detecting that a designated RBridge has gone down. The currently appointed forwarder appointees recognize that the designated RBridge has gone down by monitoring the hold-time of their adjacency with the designated RBridge expiring.
430

FIG. 4

OPTIMIZATION FOR TRILL LAN HELLOS

BACKGROUND

Current Trill specification (RFC 6325—"Routing Bridges (RBridges): Base Protocol Specification", hereby incorporated by reference in its entirety) requires Trill compliant RBridges to send multiple hellos on each interface, on a subset of enabled vlans. Specifically, depending on the appointed forwarder and the role or lack thereof of the designated RBridge, nodes must send out hellos on the following vlans, where announcing vlans are a subset of the enabled vlans on the network If the sender is a designated RBridge, hellos must be sent to the intersection set of 1) the enabled vlans and 2) the union of (designated vlan, announcing vlans). If the sender is not a designated RBridge, hellos must be sent to the intersection set of 1) the enabled vlans and 2) the union of (designated vlan, intersection of (forwarding vlans, announcing vlans)).

Based on these current stipulations, in the case where a LAN has several thousand vlans in active use, at a minimum the appointed forwarders will need to send out hellos on all of the vlans for which they are the appointed forwarder. This leads to a situation where the CPU (control plane) needs to send out thousands of hellos per interface on several hundred interfaces. This situation leads immediately to a scale problem. There exists a need for the optimization of Trill LAN Hellos.

BRIEF DESCRIPTION OF THE DRAWINGS

The accompanying drawings, which are incorporated in and constitute a part of this disclosure, illustrate various embodiments. In the drawings:

FIG. 3 illustrates embodiments of exit from the optimized-hello mode;

FIG. 4 illustrates embodiments of dealing with a node going down in embodiments of the present disclosure;

DESCRIPTION OF EXAMPLE EMBODIMENTS

Overview

Figure 1:
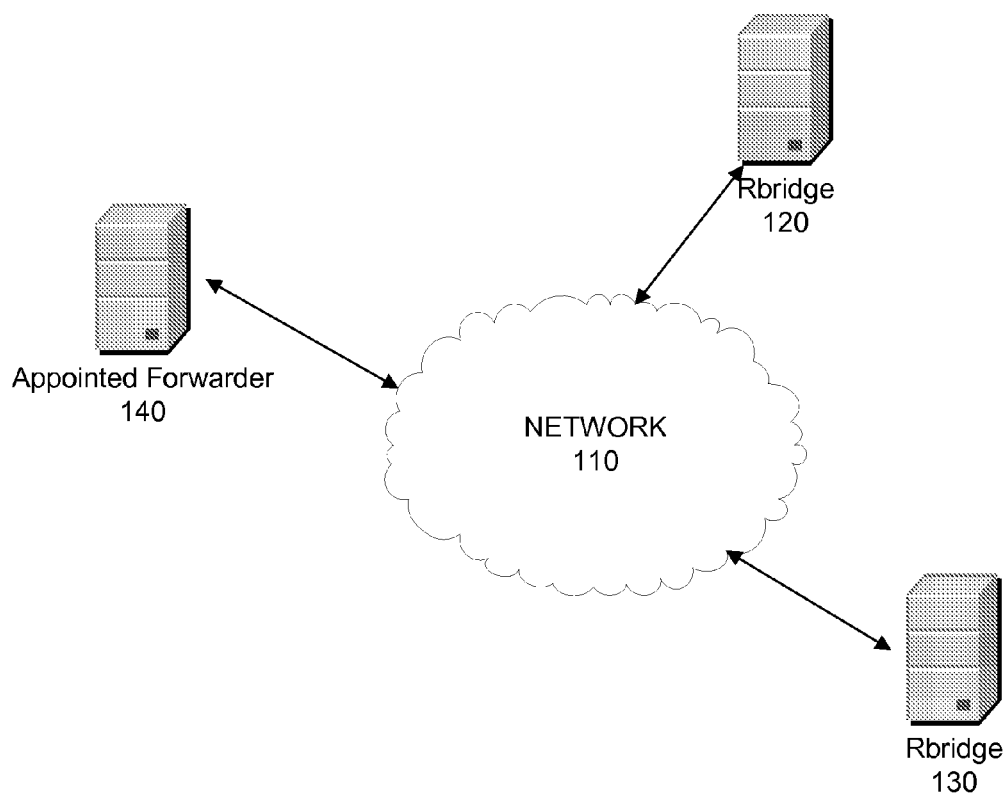
FIG. 1 is a block diagram of an operating environment.

Consistent with embodiments of the present disclosure, systems and methods are disclosed for operation of a Trill LAN network using optimized hello mode. For example, a method is disclosed comprising achieving steady state converged operation on a Trill LAN network and entering a plurality of nodes into an optimized hello mode, wherein optimized hello mode requires that the plurality of nodes only send hellos on a currently designated vlan and that no appointed forwarder inhibition hellos are exchanged.

In some embodiments, one of the plurality of nodes is a designated RBridge that enters into optimized hello mode when one or more appointed forwarder appointments have been identified. The method may further comprise waiting for a first stabilization interval before entering the designated RBridge into optimized hello mode. In some embodiments, the designated RBridge may include appointed forwarder appointments in every hello.

In other embodiments, one of the plurality of nodes is an appointed forwarder that enters into optimized hello mode upon receipt of appointed forwarder appointments and the expiration of a plurality of inhibition timers have expired.

Similarly, one of the plurality of nodes may be a node that is not a designated Rbridge and is not an appointed forwarder, and the one of the plurality of the nodes may enter into optimized hello mode upon seeing appointed forwarder inhibition hellos originating from an appointed forwarder's appointees.

Some embodiments disclose Trill network node comprising a memory and a processor coupled to the memory, wherein the processor is operative to: enter the network node into an optimized hello mode; and exit the network node from the optimized hello mode upon detection of predetermined conditions.

The network node may be a designated RBridge that exits from optimized hello mode when the designated RBridge sees a hello from a new neighbor node and the designated RBridge is on a vlan that is present in an enabled-vlans set stored in the memory. Furthermore optimized hello mode may be exited immediately upon determining that the new neighbor node has a higher designated RBridge priority than the network node. Optimized hello mode may be maintained upon determining that the new neighbor node has a lower or equal designated RBridge priority than the network node.

In some embodiments, the network node is an appointed forwarder that exits from optimized hello mode when an inbound hello is seen on a vlan in the appointed forwarder's enabled-vlan set stored in the memory and when a neighbor node responsible for the inbound hello has a higher designated RBridge priority than the network node. The neighbor node may then be regarded as the new designated RBridge and the network node may relinquish the status as an appointed forwarder.

Similarly, the network node may be a node that is not a designated Rbridge and is not an appointed forwarder, and wherein the network node exits optimized hello mode upon receiving a hello from a new neighbor node on a locally enabled vlan and when the new neighbor node has a designated RBridge priority higher than the priority of a currently designated RBridge.

Some embodiments of the present disclosure disclose a method comprising: entering a plurality of Trill LAN network nodes into an optimized hello mode; detecting the failure of one of the plurality of network nodes; and responding to the network node failure based on the role of the network node.

If the failed node does not have a role as a designated Rbridge or an appointed forwarder, no action may be taken upon detection of node failure. Alternatively, if the failed node has a role of an appointed forwarder, the method may further comprise: detecting that a hello on the desired designated vlan from the appointed forwarder is timing out; re-running an appointed forwarder appointment algorithm; and exiting optimized hello mode.

If the failed node has a role of a designated RBridge, the method may further comprise: detecting that the hold-time of an adjacency with the designated RBridge is expiring; relinquishing the role of a plurality of appointed forwarders; and electing a new designated RBridge.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the present disclosure propose an optimization, where in a Trill LAN network, once steady state converged operation is achieved, nodes will only send Hellos on the current designated vlan and no appointed forwarder inhibition hellos are exchanged. The current designated vlan may be the current designated RBridge's desired designated vlan.

Rules are disclosed herein for use when nodes in the network may enter the optimized hello mode of operation. Similarly operational rules may be described for the exit from the optimized hello mode of operation for safe operation of the Trill protocol per specification.

FIG. 1 is a block diagram illustrating an operating environment for providing optimized hello mode. A Trill network may comprise a number of network nodes communicating to one another through a network, such as Ethernet cloud 110.

Such network nodes may include RBridge nodes such as RBridge 120 and RBridge 130. Generally, routing bridges (RBridges) provide optimal pair-wise forwarding without configuration, safe forwarding even during periods of temporary loops, and support for multipathing of both unicast and multicast traffic. They achieve these goals using IS-IS routing and encapsulation of traffic with a header that includes a hop count.

RBridges are compatible with IEEE 802 customer bridges as well as IPv4 and IPv6 routers and end nodes. They are as invisible to current IP routers as bridges are and, like routers, they terminate the bridge spanning tree protocol.

The design supports VLANs and the optimization of the distribution of multi-destination frames based on VLAN ID and based on IP-derived multicast groups. It also allows unicast forwarding tables at transit RBridges to be sized according to the number of RBridges (rather than the number of end nodes), which allows their forwarding tables to be substantially smaller than in conventional bridges.

Trill network may include a plurality of other connected nodes. For example, node 140 may be an RBridge designated as an appointed forwarder node. Any number of other nodes may exist within the Trill network and the figure is for example purposes only and should not be construed as limiting to the described embodiments of this disclosure.

Figure 2:
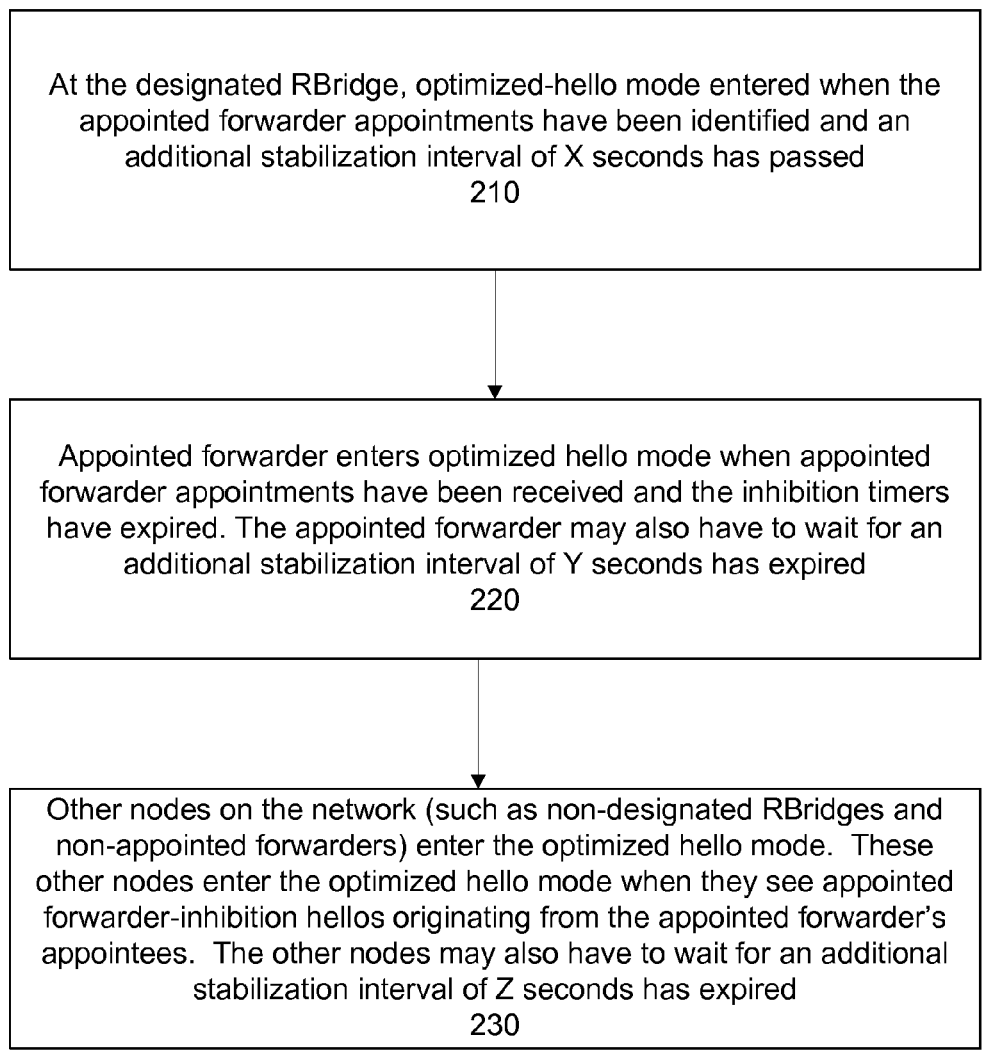
FIG. 2 illustrates embodiments of entry into the optimized-hello mode.

FIG. 2 illustrates embodiments of entry into the optimized-hello mode. It should be understood that nodes may enter the optimized hello mode at appropriate triggers depending on the particular node's role. Method 200 may begin at step 210 where at the designated RBridge, optimized-hello mode may be entered when the appointed forwarder appointments have been identified and an additional stabilization interval of X seconds has passed. In some embodiments, as an additional safeguard, the protocol may require that the designated RBridge include appointed forwarder appointments in every hello.

Method 200 may then proceed to step 220. At step 220, the appointed forwarder may enter optimized hello mode when appointed forwarder appointments have been received and the inhibition timers have expired (as the appointed forwarder appointment has been enacted in hardware). The appointed forwarder may also have to wait for an additional stabilization interval of Y seconds has expired.

Next, method 200 may proceed to step 230 where other nodes on the network (such as non-designated RBridges and non-appointed forwarders) may enter the optimized hello mode. These other nodes may enter the optimized hello mode when they see appointed forwarder-inhibition hellos originating from the appointed forwarder's appointees. The appointees may indicate the forwarding vlans. The other nodes may also have to wait for an additional stabilization interval of Z seconds has expired. In some embodiments, $X>Y>Z$ for the duration of the stabilization intervals.

RBridges may need to exit the optimized hello mode when there is a churn in the network, and when certain triggers may be detected. Upon exit from the optimized hello mode, nodes may resume normal hello operations as outlined in the Trill protocol specification.

FIG. 3 illustrates embodiments of exit from the optimized-hello mode. Method 300 may begin at step 310 where at the designated RBridge, optimized-hello mode may be exited when the designated RBridge sees a hello from a new neighbor and is on a vlan that is present in the enabled-vlans-set on the designated RBridge.

If the designated RBridge priority of the new neighbor is higher than the current designated RBridge priority, then the current designated RBridge must exit optimized hello mode immediately. Furthermore, if the designated RBridge sees its appointed forwarder appointees sending inhibition hellos, the designated RBridge must exit optimized hello mode immediately.

Alternatively, if the designated RBridge priority of the new neighbor is lower than or equal to the current designated RBridge priority, then the designated RBridge does not exit optimized hello mode. However, the designated RBridge must send additional hellos on the vlan of the newly received hello. These hellos may reflect current appointed forwarder appointments. These additional hellos may be stopped after the state of the adjacency with the new neighbor goes to 2-way or beyond.

Method 300 may proceed to step 320 where triggers may be monitored at the appointed forwarder RBridge. For example, if an inbound hello is seen on a vlan in the appointed forwarder node's enabled vlan set and if the designated RBridge priority of the new neighbor is higher than that of the current designated RBridge priority, the node must exit optimized hello mode immediately. This may also cause the current designated RBridge to exit optimized hello mode.

Furthermore, Trill allows the current appointed forwarder to regard the new neighbor (with higher designated RBridge priority) as the new designated RBridge immediately regardless of which vlan the new neighbor's hello was received on. In some embodiments, the new neighbor's hello does not have to be on the current designated vlan. Once the appointed forwarder sees a new designated RBridge, the appointed forwarder must relinquish its role immediately. This role change may be flagged in its subsequent hellos as the node has now exited optimized hello mode and the current designated RBridge will recognize this as well. Whether the current designated RBridge sees the new neighbor may depend on whether their enabled-vlan sets overlap.

If the inbound hello is seen on a locally enabled vlan and if the designated RBridge priority of the new neighbor is equal to or lower than that of the current designated RBridge, the appointed forwarder node may continue to operate in optimized hello mode. However, the appointed forwarder node must originate a few inhibition hellos on any of its forwarding vlans to force the designated RBridge to exit optimized hello mode. This covers the possibility that the current designated vlan may not be enabled on the new neighbor but some other vlan in the designated RBridge's announcing set may be enabled on the neighbor. In effect, this forces the new neighbor to sync up with the designated RBridge's current appointments. The additional inhibition hellos can be terminated when the designated RBridge's hellos are seen on vlans other than the currently designated vlan, bearing appointed forwarder appointments.

If an appointed forwarder RBridge sees hellos on vlans other than the current designated vlan from nodes which it knows are neither appointed forwarders for any vlan nor the designated RBridge, then the appointed forwarder RBridge must exit optimized hello mode immediately.

Method 300 may proceed to step 330 where other nodes on the network (such as non-designated RBridges and non-appointed forwarders) operating in the optimized hello mode may be monitored for triggers. For example, if a hello is received from a new neighbor on a locally enabled vlan and if the designated RBridge priority of that node is higher than the priority of the currently designated RBridge, then the other node must exit optimized hello mode immediately. Per Trill operation, the node will regard the new neighbor as the designated RBridge and switch to its designated vlan. Furthermore, the node may be appointed as the appointed forwarder in the near future.

FIG. 4 illustrates embodiments of dealing with a node going down in embodiments of the present disclosure. It may be realized that a node has gone down when the hold time of the adjacency with that neighbor expires, which in turn is driven by hellos from that node on the desired designated vlan.

Method 400 may start at step 410 where it is detected that a non-designated RBridge or a non-appointed forwarder has gone down. No action is required in this instance. Method 400 may then proceed to step 420 when it is detected that an appointed forwarder has gone down.

At step 420, the designated RBridge must now realize the failure when the hello on the desired designated vlan from the appointed forwarder starts timing out. The designated RBridge may then re-run the appointed forwarder appointment algorithm when this happens. When this occurs, the optimized hello mode must be exited immediately. Cases where an appointed forwarder reflects its appointed forwarder status incorrectly in hellos, by claiming the appointed forwarder for vlans that the designated RBridge did not assign it, may be treated similarly. After the designated RBridge elections and appointed forwarder appointments are complete, a fresh attempt to enter optimized hello mode may be made after suitable stabilization intervals using the entry criteria described above.

Method 400 may then proceed to step 430. At step 430, it may be detected that a designated RBridge has gone down. The currently appointed forwarder appointees may recognize that the designated RBridge has gone down by monitoring the hold-time of their adjacency with the designated RBridge expiring. The adjacency may be a pseudo-node adjacency or a regular one. When the adjacency expires, appointed forwarders must relinquish their role as appointed forwarders and elect a new designated RBridge. Optimized hello mode must be exited immediately when this occurs. After the designated RBridge elections and appointed forwarders appointments are complete, a fresh attempt may be made to enter optimized hello mode after suitable stabilization intervals using the entry criteria described above.

In some embodiments, Trill nodes may be configured with a default announcing set consisting of a first vlan. The first vlan will be enabled by default on all devices as the default (desired) designated vlan. This may result in plug-and-play functionality for users where operation occurs without user intervention such that there are minimal hellos exchanged.

Figure 5:
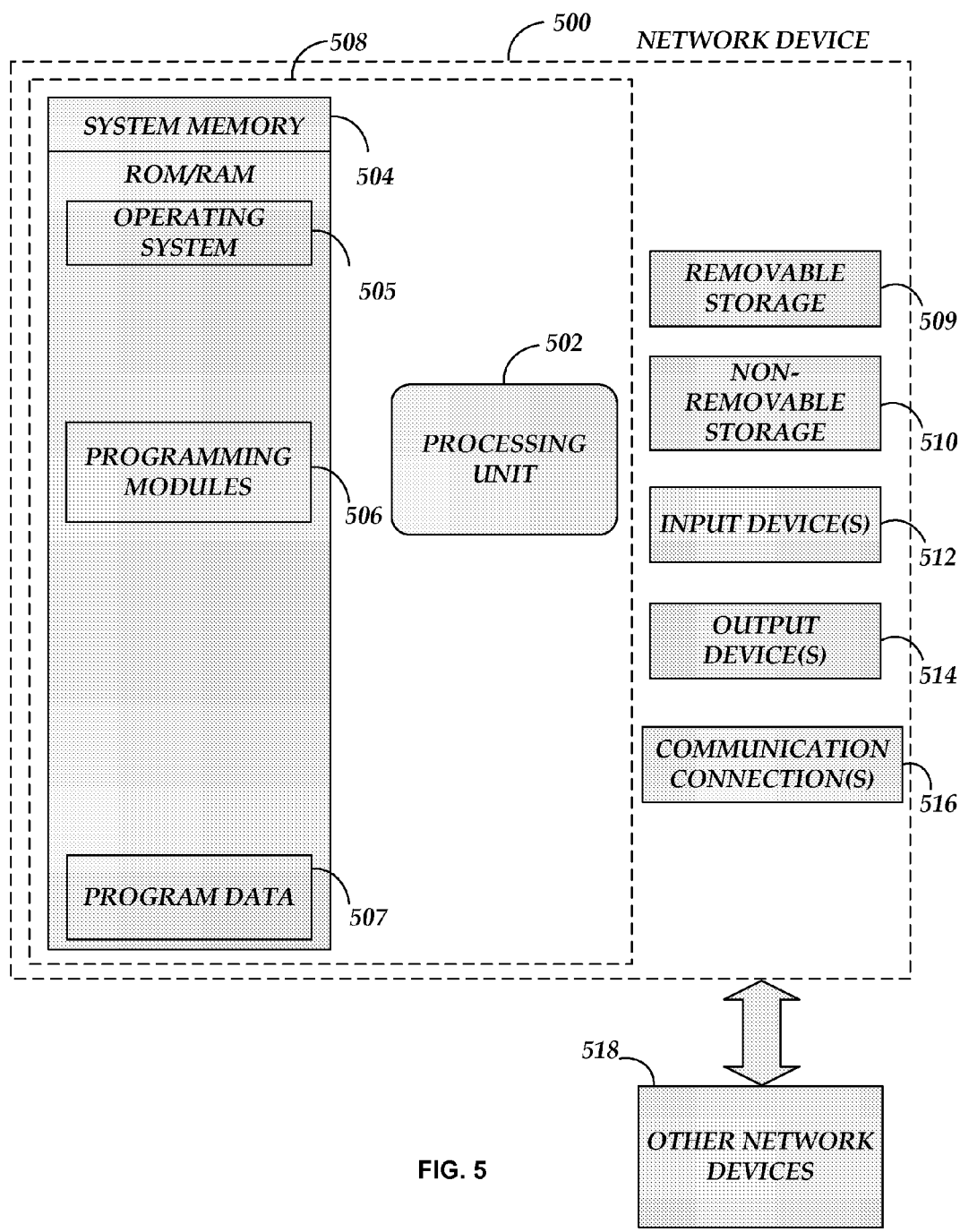
FIG. 5 is a block diagram of a network node.

FIG. 5 is a block diagram of a system including network node 120. Consistent with embodiments of the present disclosure, the aforementioned memory storage and processing unit may be implemented in a network device, such as network device 120 of FIG. 1. Any suitable combination of hardware, software, or firmware may be used to implement the memory storage and processing unit. For example, the memory storage and processing unit may be implemented with network device 120 or any of other network devices 418, in combination with network device 120. The aforementioned system, device, and processors are examples and other systems, devices, and processors may comprise the aforementioned memory storage and processing unit, consistent with embodiments of the present disclosure.

With reference to FIG. 5, a system consistent with embodiments of the present disclosure may include a network device, such as network device 120. In a basic configuration, network device 120 may include at least one processing unit 502, a secure processing unit for decryption 520, and a system memory 504. Depending on the configuration and type of network device, system memory 504 may comprise, but is not limited to, volatile (e.g., random access memory (RAM)), non-volatile (e.g., read-only memory (ROM)), flash memory, or any combination. System memory 504 may include operating system 505, one or more programming modules 506, and may include program data 507. Operating system 505, for example, may be suitable for controlling network device 120's operation. Furthermore, embodiments of the present disclosure may be practiced in conjunction with a graphics library, other operating systems, or any other application program and is not limited to any particular application or system. This basic configuration is illustrated in FIG. 5 by those components within a dashed line 508.

Network device 120 may have additional features or functionality. For example, network device 120 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 120. Any such computer storage media may be part of device 120. Network device 120 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Network device 120 may also contain a communication connection 516 that may allow device 120 to communicate with other network devices 518, such as over a network in a distributed network environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502 or secure processing unit for decryption 520, programming modules 506 may perform processes including, for example, one or more method 200, 300, or 400's stages as described above. The aforementioned process is an example; processing unit 502 and secure processing unit for decryption 520 may perform other processes.

Generally, consistent with per-subscriber stream management according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the present disclosure may also be practiced in distributed network environments where tasks are performed by remote processing devices that are linked through a communications network. In a distributed network environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present disclosure, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of per-subscriber stream management. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present disclosure have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the present disclosure.

What is claimed is:
1. A method comprising:
 entering a plurality of nodes on a TRILL (Transparent Interconnection of Lots of Links) LAN network into an optimized hello mode by a by a Trill LAN network node comprising the steps of:

entering a designated RBridge into the optimized hello mode after a first stabilization interval;

entering an appointed forwarder into the optimized hello mode after a second stabilization interval subsequent to the first stabilization interval; and entering a node that is not a designated Rbridge and is not an appointed forwarder into the optimized hello mode after a third stabilization interval subsequent to the first stabilization interval and the second stabilization interval, wherein the first stabilization interval is longer than the second stabilization interval and the second stabilization interval is longer than the third stabilization interval;

wherein optimized hello mode requires that the plurality of nodes only send hellos on a currently designated VLAN (Virtual Local Area Network) and that no appointed forwarder inhibition hellos are exchanged, wherein one of the plurality of nodes is an appointed forwarder that enters into optimized hello mode upon receipt of appointed forwarder appointments and an expiration of a plurality of inhibition timers have expired.

2. The method of claim 1, wherein one of the plurality of nodes is a designated RBridge that enters into optimized hello mode when one or more appointed forwarder appointments have been identified.

3. The method of claim 2, further comprising requiring the designated RBridge to include appointed forwarder appointments in every hello.

4. The method of claim 1, wherein one of the plurality of nodes is a node that is not a designated Rbridge and is not an appointed forwarder, and wherein the one of the plurality of the nodes enters into optimized hello mode upon seeing appointed forwarder inhibition hellos originating from an appointed forwarder's appointees.

5. The method of claim 4, wherein the appointed forwarder's appointees indicate a plurality of forwarding vlans in the hellos.

6. A Trill LAN network node comprising:
a memory; and
a processor coupled to the memory, wherein the processor is operative to:
enter the network node into an optimized hello mode wherein optimized hello mode requires that the plurality of nodes only send hellos on a currently designated VLAN (Virtual Local Area Network) and that no appointed forwarder inhibition hellos are exchanged comprising the steps of:
entering a designated RBridge into the optimized hello mode after a first stabilization interval;
entering an appointed forwarder into the optimized hello mode after a second stabilization interval subsequent to the first stabilization interval; and
entering a node that is not a designated Rbridge and is not an appointed forwarder into the optimized hello mode after a third stabilization interval subsequent to the first stabilization interval and the second stabilization interval, wherein the first stabilization interval is longer than the second stabilization interval and the second stabilization interval is longer than the third stabilization interval; and
exit the network node from the optimized hello mode upon detection of predetermined conditions, wherein the network node is an appointed forwarder that enters into optimized hello mode upon receipt of appointed forwarder appointments and an expiration of a plurality of inhibition timers have expired.

7. The Trill LAN network node of claim 6, wherein the network node is a designated RBridge that exits from optimized hello mode when the designated RBridge sees a hello from a new neighbor node and the designated RBridge is on a vlan that is present in an enabled-vlans set stored in the memory.

8. The Trill LAN network node of claim 7, wherein the processor is further operative to: exit optimized hello mode immediately upon determining that the new neighbor node has a higher designated RBridge priority than the network node; and maintain optimized hello mode upon determining that the new neighbor node has a lower or equal designated RBridge priority than the network node.

9. The Trill LAN network node of claim 6, wherein the network node is an appointed forwarder that exits from optimized hello mode when an inbound hello is seen on a vlan in the appointed forwarder's enabled-vlan set stored in the memory and when a neighbor node responsible for the inbound hello has a higher designated RBridge priority than the network node.

10. The Trill LAN network node of claim 9, wherein the processor is further operative to: regard the neighbor node as the new designated RBridge; and relinquish a status as an appointed forwarder.

11. The Trill LAN network node of claim 6, wherein the network node is a node that is not a designated Rbridge and is not an appointed forwarder, and wherein the network node exits optimized hello mode upon receiving a hello from a new neighbor node on a locally enabled vlan and when the new neighbor node has a designated RBridge priority higher than the priority of a currently designated RBridge.

12. A method comprising:
entering a plurality of Trill LAN network nodes, wherein one of the plurality of nodes is an appointed forwarder that enters into optimized hello mode upon receipt of appointed forwarder appointments and an expiration of a plurality of inhibition timers have expired, into an optimized hello mode by a Trill LAN network node wherein optimized hello mode requires that the plurality of nodes only send hellos on a currently designated VLAN (Virtual Local Area Network) and that no appointed forwarder inhibition hellos are exchanged comprising the steps of:
entering a designated RBridge into the optimized hello mode after a first stabilization interval;
entering an appointed forwarder into the optimized hello mode after a second stabilization interval subsequent to the first stabilization interval; and
entering a node that is not a designated Rbridge and is not an appointed forwarder into the optimized hello mode after a third stabilization interval subsequent to the first stabilization interval and the second stabilization interval, wherein the first stabilization interval is longer than the second stabilization interval and the second stabilization interval is longer than the third stabilization interval;
detecting a failure of one of the plurality of network nodes; and
responding to the network node failure based on the role of the network node.

13. The method of claim 12, wherein the failed node does not have a role as a designated Rbridge or an appointed forwarder, further comprising taking no action upon detection of node failure.

14. The method of claim 12, wherein the failed node has a role of an appointed forwarder, further comprising: detecting that a hello on the desired designated vlan from the appointed forwarder is timing out; re-running an appointed forwarder appointment algorithm; and exiting optimized hello mode.

15. The method of claim 14, further comprising: waiting for one or more stabilization intervals; and attempting to re-enter optimized hello mode.

16. The method of claim 12, wherein the failed node has a role of a designated RBridge, further comprising: detecting that a hold-time of an adjacency with the designated RBridge is expiring.

17. The method of claim 16, further comprising: relinquishing the role of a plurality of appointed forwarders; and electing a new designated RBridge.

18. The method of claim 16, wherein the adjacency is a pseudo-node adjacency.

* * * * *